3,377,395
PROCESS FOR DIMINISHING CUPRENE FORMATION

Frank J. Christoph, Jr., Elkton, Md., assignor to E. I. du Pont de Nemours and Company, Wilmington, Del., a corporation of Delaware
No Drawing. Filed May 3, 1965, Ser. No. 452,853
3 Claims. (Cl. 260—653.4)

ABSTRACT OF THE DISCLOSURE

Process which diminishes cuprene formation in the preparation of vinyl fluoride from acetylene and hydrogen fluoride in the presence of a catalyst at about 250° C., by adding nitric acid to the reactants. Process which diminishes cuprene formation in processes in which acetylene is heated to 250° C., by pretreating the reaction chamber with nitric acid.

---

The present invention is directed to a method for preventing or diminishing cuprene formation in process systems where acetylene is heated at temperatures of 250° C. or above.

Cuprene is a polymer of acetylene having an empirical formula of $-(C_7H_6)-_n$. Cuprene was first observed when acetylene was contacted with a spongy copper catalyst, hence the name cuprene. It was observed in systems involving copper catalysts for converting acetylene to monovinyl acetylene and has been extensively studied in this reaction.

It has recently been found that cuprene is also formed when acetylene is heated at temperatures above 250° C., particularly in the presence of active surfaces such as metals or metal derivatives. In such processes where acetylene is reacted at high temperatures, cuprene formation is highly undesirable since it plugs the reaction apparatus requiring unnecessary shutdowns of the equipment for cleaning. The reaction of acetylene with hydrogen fluoride at temperatures of 250° C. and above to form vinyl fluoride and 1,1-difluoroethane as described in U.S. Patent 2,471,525 is an example of a process where cuprene formation in the reactor apparatus is extremely undesirable.

It is, therefore, an object of this invention to provide a novel process for preventing or diminishing cuprene formation in processes where acetylene is heated to temperatures of 250° C. and above.

More specifically, the present invention is directed to a process for diminishing cuprene formation in processes where acetylene is subjected to temperatures of at least 250° C. which comprises employing nitric acid as a cuprene inhibitor.

The present process comprises employing strong nitric acid as a cuprene inhibitor in any process where acetylene is heated to a temperature of at least 250° C. Cuprene formation in such processes is traced entirely to acetylene and is indepedent of the presence of other reactants, such as hydrogen fluoride, in the reaction system. The utilization of nitric acid as a cuprene inhibitor may be accomplished by several methods as well be apparent to those skilled in the art. For example, since the formation of cuprene occurs predominantly on the surfaces of the heated reactor equipment, pretreatment of the reactor with nitric acid can effectively diminish cuprene formation during the acetylene process. This prior treatment consists of washing, soaking or otherwise contacting the heated portion of the apparatus which comes into contact with acetylene with strong nitric acid. After this treatment the system is washed with water and thereafter dried. The time of pretreatment is not critical, one-half hour being convenient. The pretreatment temperature is likewise not critical. Since nitric acid is highly corrosive to most metals, the use of elevated temperatures which accelerate corrosion is not desirable for the pretreating process. Room temperature, say 20° C. to 30° C., has been found most convenient for pretreatment, but higher or lower temperatures may be used, such as 0° C. to 60° C. The apparatus is washed with water to remove the excess nitric acid and then dried since water in large amounts may be detrimental to the particular acetylene reactions being carried out. For example, when the reactions in the apparatus involve hydrogen fluoride, it is undesirable to have water present due to the highly corrosive nature of hydrogen fluoride in the presence of water.

The nature of the action of nitric acid in preventing cuprene formation has not been fully established. However, it has been discovered that its inhibiting action is lost if the apparatus is exposed after nitric acid treatment to oxygen or air at high temperatures such as during regeneration of the catalyst and the like. If such exposure takes place, the apparatus must again be treated with nitric acid if cuprene formation is to be diminished. It is possible to regenerate the catalyst with air and high temperatures without losing the inhibiting effect of a nitric acid pretreatment if nitric acid is passed into the reactor along with the air.

Instead of pretreating the apparatus with nitric acid, it is possible to prevent cuprene formation by concurrently feeding nitric acid into the system with the acetylene. Although a number of means exist for adding nitric acid to the system, it has been found convenient to carry out the process by merely passing the acetylene feed stream at, say, 20° C. to 30° C., through concentrated nitric acid before it enters the reaction zone. Another alternative method is to pretreat the apparatus by passing air through nitric acid and then into the heated zone.

The method of employing the nitric acid inhibitor is not critical, nor is any particular method preferred. Depending on the particular acetylene process, one method will be more convenient over the others as will be readily apparent to one skilled in the art.

The strength of the nitric acid employed to diminish cuprene formation is not critical, since an improvement in inhibiting cuprene formation is recognized regardless of the strength of nitric acid used. Nitric acid in a concentration range of from 5% to 70% has been fully successful in diminishing cuprene formation. Concentrated nitric acid (60% to 70%) is preferred. Although fuming nitric acid may be used, it offers no advantages over ordinary concentrated nitric acid.

Nitric acid seems to be unusual in its utilization in the process of the present invention since it has been found that solutions of nitrates or nitrites, or nitrogen dioxide, are ineffective. Other acids such as hydrochloric or sulfuric also appear to be ineffective. Inclusion of polymerization inhibitors such as limonene or propylene in the acetylene during the high temperature reaction is also ineffective for preventing cuprene formation.

The presence of nitric acid in the feed does not have any recognizable adverse effect on the conversion of acetylene or yield of the particular high-temperature acetylene process involved. For example, it has been found that if a catalyst is used for converting the acetylene to another product, the activity of the catalyst is not appreciably affected by the presence of nitric acid in the acetylene feed. In this regard, it has been observed that catalysts which are useful for converting acetylene to products such as vinyl fluoride also tend to catalyze the formation of cuprene. This catalytic effect appears to be so great that the presence of nitric acid in the acetylene feed does not noticeably inhibit the formation of cuprene on and around the catalyst.

Representative examples illustrating the present invention are as follows. All parts are by weight unless specified otherwise.

Example 1

A U-type reactor was constructed entirely of Inconel and consisted of a ½" by 30" preheater and a 1" by 30" reactor connected by suitable Inconel fittings. In the reactor section there was suspended on Inconel wire the following test coupons: 316 and 304 stainless steel, Inconel, Monel and Hastelloy C. The entire apparatus was immersed in a molten Hi-Tec salt bath maintained at 250° C. Acetylene at 150 ml./min. and hydrogen fluoride at 9.8 g./hr. were fed through the apparatus for 98 hours. On disassembly, it was found that all of the test pieces contained a tan cuprene deposit and cuprene was also present throughout the entire preheater and reactor system. The ½" preheater contained a light quantity of polymer near the top with a heavier film being present near the bottom. The connection between preheater and reactor contained a very heavy deposit at both of the elbows and a heavy film was also present in the reactor up to the level at which it had been immersed in the salt bath. Both the Inconel and Hastelloy C test pieces had blotches of cuprene formation, there being bare patches where no cuprene was present. The 316 and 304 stainless steel and Monel test pieces contained large nodules of cuprene in addition to a heavy uniform surface layer.

Example 2

Another analysis of cuprene formation was made, similar to that of Example 1, except that the reaction continued for only 50 hours instead of 98 hours. After 50 hours the reactor was opened and the cuprene formed was found to be much different from that found after 98 hours. The deposits on the test pieces were in the form of large pieces rather than as an adherent film. The preheater was relatively clean, but the reactor was covered by a film of cuprene from the catalyst support screen to the level of the salt bath.

Example 3

The same apparatus and experimental conditions were used here as in Example 1. The test pieces used in Example 1 were cleaned and then soaked in nitric acid for ½ hour, washed with deionized water and dried. The Monel piece was heavily attacked by the nitric acid and consequently was not used in this run. After 40 hours in a stream containing acetylene and hydrogen fluoride at 250° C., the reactor was opened and the test pieces had only a very slight deposit of cuprene which was identified by touch rather than by sight since it was transparent. The run was continued for a total of 100 hours and a comparison in weight of cuprene on the test pieces obtained in Examples 1 and 3 are shown in Table I below.

It can be seen that there is a remarkable difference between the amount of cuprene formed when the test pieces were treated with nitric acid and when they were left untreated. The reactor system itself also contained much less cuprene than was found in Example 1.

TABLE I.—AMOUNT OF CUPRENE FORMATION ON VARIOUS METAL SURFACES AFTER APPROXIMATELY 100 HOURS OF REACTION

| Type of Metal | Cuprene Formation, Grams | |
| --- | --- | --- |
|  | Treated | Untreated |
| Inconel | 0.0008 | 0.0077 |
| Hastelloy C | 0.0005 | 0.0060 |
| 304 stainless steel | 0.0055 | 0.0930 |
| 316 stainless steel | 0.0018 | 0.0348 |

Example 4

The same apparatus and experimental conditions as used in Example 2 were employed in Example 4 except that new test pieces were obtained and soaked in concentrated nitric acid for one-half hour, washed with deionized water and dried. The reactor and preheater system was assembled and filled with concentrated nitric acid and allowed to stand for the same length of time before discharging, washing with deionized water and drying. After 49.5 hours the reactor was removed from the salt bath, cooled and reopened. The metal test pieces were still bright with no evidence of cuprene. The Hastelloy C wire which was used to suspend the test pieces was also clean and bright. The preheater contained a light deposit of coke, but there was no cuprene in it or in the connector leading to the reactor. The reactor itself contained a film of cuprene up to the salt bath level. After 100 hours in a mixture of acetylene and hydrogen fluoride at 250° C. the Inconel test piece had darkened and contained some cuprene along one edge. The Hastelloy C remained bright with no sign of cuprene. The 304 stainless steel darkened and contained a slight film of cuprene. The 316 stainless steel had darkened only, and contained no polymer. The nitric acid pretreatment had a very significant effect on the amount of cuprene deposited on these test pieces under the conditions given above.

Example 5

The procedure of Example 2 was again followed with the exception that the temperature of reaction was raised 50° C. from 250° C. to 300° C. After 50 hours all of the test pieces contained cuprene. The 304 stainless steel was the worst in the visual tests. The Inconel had darkened and also contained cuprene. The Hastelloy C wire used to suspend the test pieces contained a light deposit on the bottom and a heavier one on the top. Cuprene was also present as a polymer film in the bottom sections of the preheater and reactor and also in the Inconel connection between the two. From the results obtained, it can be seen that a 50° C. difference in temperature of acetylene reaction had a very definite effect on the formation of cuprene.

Example 6

The reactor systems and experimental conditions were the same as used in Example 5 except that the test pieces and reactor were pretreated with concentrated nitric acid as before, washed with water and dried. After 52 hours at 300° C. in a stream of acetylene and hydrogen fluoride, the Hastelloy C coupon was bright and contained only a few nodules of cuprene. Inconel, 304 stainless steel and 316 stainless steel were discolored, but cuprene was absent. Cuprene was present as a film in the preheater and in the reactor but very little in the connector between the two. The nitric acid treatment had a very significant effect on reduction of cuprene on the test pieces, reactor and preheater system.

Example 7

The parts of the Inconel reactor and metal test coupons were heated in a large furnace at 500° C. for 4 hours in air. All of the test pieces except the Hastelloy C were discolored by this treatment. The test pieces were then placed in the assembled reactor which was then immersed in a Hi-Tec salt bath at 300° C. Acetylene at 150 ml./min. and hydrogen fluoride at 9.8 g./hr. were fed through the reactor for 50 hours. After this time all of the test pieces were covered with a heavy coating of cuprene, and the preheater and reactor also had a heavy deposit. The quantity formed here was much greater than that found in a reactor that had not been oxidized before use. This example demonstrates the effect of regeneration conditions on cuprene formation.

Example 8

A mixture of acetylene and nitrogen at 150 ml./min. each was passed through an Inconel reactor which contained 117 g. of aluminum fluoride catalyst. The nitrogen was used as a diluent to prevent the dangerous thermal decomposition of acetylene. The reactor was immersed in a Hi-Tec salt bath kept at 320° C. to 335° C. for 41.5 hours and under these conditions the catalyst pellets were covered with cuprene. The preheater had a uniform film from the level of the salt bath to the elbow connecting to the reactor. The elbow contained the heaviest deposit. The reactor also contained a heavy deposit at the catalyst support screen.

Example 9

The same apparatus and experimental conditions as in Example 8 were employed here, except that the acetylene was bubbled through concentrated nitric acid before it entered the preheater to mix with the nitrogen. After 41 hours at 325° C. no cuprene was obtained in the preheater or in any part of the reactor system before the catalyst support screen. Cuprene was present in a heavy deposit on the catalyst pellets and a slight film on the sides of the reactor. Thus, nitric acid had definitely a beneficial effect on the formation of cuprene in the stainless steel equipment, but did not affect cuprene formation around the aluminum fluoride catalyst. This example also demonstrates that bubbling acetylene through nitric acid vaporizes an amount which is sufficient to prevent cuprene formation in the reactor during the reaction of acetylene at temperatures above 250° C.

Example 10

The Inconel reactor parts and metal test pieces were heated in a furnace for 4 hours at 500° C. The test pieces were suspended in the reactor and the assembled equipment immersed in a Hi-Tec salt bath at 300° C. Acetylene was fed at 150 ml./min. after bubbling through concentrated nitric acid and hydrogen fluoride was added at 9.8 g./hr. The reaction was carried out at atmospheric pressure. After 48 hours the reactor was opened and no cuprene was observed on any of the test pieces or in the reactor system itself. The test pieces were clean, but had the original dark color which developed under the oxidizing conditions. A comparison of this result with that of Example 7 showed that nitric acid fed in a quantity equivalent to its vapor pressure in acetylene at room temperature prevents the formation of cuprene. In the reactor system and on various test metal pieces contained in the reactor the Inconel or Hastelloy C coupons remained shiny, but the 304 and 316 stainless steel had a coating of carbon.

Example 11

A new stainless steel reactor containing the usual metal test pieces was immersed in a Hi-Tec salt bath at 450° C. Air was fed through the system at 300 ml./min. for 10 hours. The air was bubbled through concentrated nitric acid before passing through the reactor. The test pieces were discolored after this air treatment, which was intended to parallel regeneration conditions in the direct process to vinyl fluoride. The temperature of the salt bath was then dropped to 300° C., and acetylene fed at 150 ml./min. and hydrogen fluoride at 9.8 g./hr. for a total of 50 hours. On opening the reactor system, the preheater and reactor contained only a few nodules of cuprene. The Hastelloy C and Inconel test pieces retained the original color caused by oxidation. The 304 stainless steel had a deposit of carbon and the 316 stainless steel had a film of cuprene. This experiment illustrates the fact that cuprene formation in the reactor can be inhibited by employing nitric acid in a number of ways, such as feeding the nitric acid along with the regeneration air as well as by bubbling feed acetylene through nitric acid or pretreating the entire system with liquid nitric acid.

Example 12

Methyl acetylene was passed through a stainless steel reactor containing the usual metal test pieces which had been oxidized at 500° C. for 6 hours. Salt bath temperature was 300° C., methyl acetylene feed rate 30 ml./min., and the time of testing was 42 hours. No cuprene formed in the reactor or on the metal test pieces although some tar was present at the bottom of the reactor. Apparently methyl acetylene does not form a polymer similar to cuprene.

Example 13

A 1″ stainless steel reactor and usual test pieces were heated at 500° C. for 6 hours in air. The reactor and coupons were then treated with a 16% solution of sodium nitrite in water for 1 hour, after which time they were washed and dried. Acetylene at 150 ml./min. and hydrogen fluoride at 9.8 g./hr. were passed through the reactor at 305° C. for 42 hours. After this time all of the test pieces had a heavy coating of cuprene, both film and nodular. The preheater had a heavy coating of cuprene as large nodules, and the connector between the preheater and the reactor also contained a large amount of cuprene. The reactor itself contained mostly carbon, but did have cuprene on the part which was out of the salt bath. From the above results, it is concluded that sodium nitrite had no benefit in the prevention of cuprene.

Example 14

Using the same procedure and the same conditions as Example 13 except that a 16% solution of potassium nitrate was used in place of the sodium nitrite, the following results were obtained. After 43.5 hours the test pieces were relatively clean, although a small amount of cuprene was found on a Hastelloy C coupon. Nodules of cuprene formed in the preheater and a very large piece was present in the connector between the preheater and the reactor. The section of the reactor in the salt bath contained carbon, but cuprene was present in the section of the reactor above the salt bath. The amount of cuprene formed here was less than that obtained in a blank run with an oxidized reactor. However, the large agglomerate which formed in the connector between reactor and preheater probably would have caused plugging eventually, and thus use of the potassium nitrate as a polymerization inhibitor was considered unsatisfactory. Also ineffective in preventing cuprene formation was nitric oxide, nitrogen dioxide, and propylene. Water and d-limonene at 320° C. are initially effective to a limited degree, but soon lose any ability to prevent cuprene formation.

It is to be understood that the preceding examples are representative and that said examples may be varied within the scope of the total specification, as understood by one skilled in the art, to produce essentially the same results.

As many apparently widely different embodiment of this invention may be made without departing from the spirit and scope thereof, it is to be understood that this invention is not limited to the specific embodiments thereof as defined herein.

The embodiments of the invention in which an exclusive property or privilege is claimed are defined as follows:

1. A process for diminishing cuprene formation in processes where acetylene is subjected to temperatures of at least 250° C. in heated metal equipment which comprises pretreating said equipment with nitric acid by contacting the reaction zone of said equipment with said nitric acid 2. A process for diminishing cuprene formation in proccesses where acetylene is subjected to temperatures of at least 250° C. in heated metal equipment which comprises pretreating said equipment by bubbling air through nitric acid and passing the air-nitric acid mixture through said equipment.

3. The process of claim 1, wherein the contacting step is carried out at about 20–30° C., and is followed by washing the reaction zone with water.

References Cited

UNITED STATES PATENTS

Lehner: J. Am. Chem. Soc., 53, 2962–2967 (1931).
Ephriam: Organic Chemistry, sixth edition 1954, pgs. 696–698. Interscience Pub., New York, N.Y.
Silcocks: Chem. Abstracts, 52, 7827ᶜ (1958).

DANIEL D. HORWITZ, *Primary Examiner.*